US 9,461,729 B2

(12) United States Patent
Djukic et al.

(10) Patent No.: US 9,461,729 B2
(45) Date of Patent: Oct. 4, 2016

(54) SOFTWARE-DEFINED NETWORK INFRASTRUCTURE HAVING VIRTUAL RANGE EXTENDERS

(71) Applicant: Huawei Technologies Co., Ltd., Shenzhen (CN)

(72) Inventors: Petar Djukic, Ottawa (CA); Amine Maaref, Kanata (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 14/106,483

(22) Filed: Dec. 13, 2013

(65) Prior Publication Data

US 2015/0171953 A1    Jun. 18, 2015

(51) Int. Cl.

| | |
|---|---|
| *H04W 4/02* | (2009.01) |
| *H04W 40/22* | (2009.01) |
| *H04W 88/04* | (2009.01) |
| *H04B 7/155* | (2006.01) |
| *H04W 4/00* | (2009.01) |
| *H04W 28/24* | (2009.01) |
| *H04W 40/16* | (2009.01) |
| *H04W 40/20* | (2009.01) |
| *H04W 16/26* | (2009.01) |
| *H04W 84/04* | (2009.01) |

(52) U.S. Cl.
CPC ......... *H04B 7/15507* (2013.01); *H04W 4/001* (2013.01); *H04W 16/26* (2013.01); *H04W 28/24* (2013.01); *H04W 40/16* (2013.01); *H04W 40/205* (2013.01); *H04W 84/047* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 2007/0097945 | A1* | 5/2007 | Wang | H04L 45/12 370/349 |
| 2008/0056199 | A1* | 3/2008 | Park | H04W 40/22 370/332 |
| 2008/0285504 | A1* | 11/2008 | Lin | H04B 7/15557 370/319 |
| 2009/0144403 | A1* | 6/2009 | Sajassi | H04L 12/4625 709/223 |
| 2011/0151774 | A1 | 6/2011 | Li et al. | |
| 2011/0258277 | A1* | 10/2011 | Hu | H04L 12/1831 709/206 |
| 2012/0147868 | A1* | 6/2012 | Williams | H04W 4/006 370/338 |
| 2012/0307714 | A1 | 12/2012 | Zhou et al. | |

(Continued)

FOREIGN PATENT DOCUMENTS

| | | |
|---|---|---|
| CN | 102148639 A | 8/2011 |
| CN | 102811446 A | 12/2012 |
| KR | 20030073619 A | 9/2003 |

OTHER PUBLICATIONS

Huawei Technologies, Inc. International Application No. PCT/CN2014/093701, "International Search Report & Written Opinion", mailing date: Mar. 13, 2015, 13 pages.

(Continued)

*Primary Examiner* — Brandon Renner
(74) *Attorney, Agent, or Firm* — Slater Matsil, LLP

(57) ABSTRACT

An embodiment method includes selecting, by a network infrastructure manager, a first user equipment (UE) as a destination UE and selecting a second UE as a relay UE for the destination UE. The method further includes negotiating installation of a virtual range extender (vREX) UE on the destination UE, and negotiating installation of a vREX forwarding agent (FA) on the relay UE. The vREX FA is configured to act as a FA for the vREX UE.

20 Claims, 11 Drawing Sheets

(56) References Cited

U.S. PATENT DOCUMENTS

| | | | | |
|---|---|---|---|---|
| 2013/0188552 A1* | 7/2013 | Kazmi | ............... | H04L 5/001 370/315 |
| 2013/0259058 A1* | 10/2013 | Vairavakkalai | ......... | H04L 45/04 370/401 |
| 2013/0260672 A1* | 10/2013 | Patil | ............... | H04M 1/7253 455/7 |
| 2014/0153546 A1* | 6/2014 | Kim | ............... | H04W 48/18 370/332 |
| 2014/0256338 A1* | 9/2014 | Xu | ............... | H04W 76/025 455/450 |
| 2014/0308966 A1* | 10/2014 | Wang | ............... | H04W 48/20 455/450 |
| 2014/0328257 A1* | 11/2014 | Kamlani | ............... | H04W 24/02 370/329 |

OTHER PUBLICATIONS

Sharma, Ashish, et al., "Cool-Tether: Energy Efficient On-the-fly WiFi Hot-spots using Mobile Phones," CoNext '09, Dec. 1-4, 2009, 12 pages.

* cited by examiner

SOFTWARE-DEFINED NETWORK INFRASTRUCTURE HAVING VIRTUAL RANGE EXTENDERS

TECHNICAL FIELD

The present invention relates to network communications, and, in particular embodiments, to a software-defined network infrastructure having virtual range extenders.

BACKGROUND

While demand for higher throughput steadily increases in wireless networks (e.g., 5G networks and beyond), a relatively small number of mechanisms are available to address this demand. One way of increasing throughput in a network is by deploying transmission points at a greater density. However, dense deployment of traditional transmission points (e.g., base stations) may be unrealistically costly. For example, deployment of a traditional transmission point may incur capital costs (e.g., costs related to leasing space, configuring transmission/power lines, and the like) and operational costs (e.g., costs of tracking transmission points, securing transmission points, maintenance, providing power, and the like). Thus, a cost barrier may prevent a network from increasing throughput through more densely deployed traditional transmission points. Furthermore, once installed, traditional transmission points are fixed in location and may not be dynamically moved to address shifts in network load and traffic conditions.

SUMMARY OF THE INVENTION

These and other problems are generally solved or circumvented, and technical advantages are generally achieved, by preferred embodiments of the present invention which provide a system and method for an agile wireless access network.

In accordance with an embodiment, a method for network infrastructure manager operations in a network includes selecting a first user equipment (UE) as a destination UE and selecting a second UE as a relay UE for the destination UE. The method further includes negotiating installation of a virtual range extender (vREX) UE on the destination UE, and negotiating installation of a vREX forwarding agent (FA) on the relay UE. The vREX FA is configured to act as a FA for the vREX UE.

In accordance with another embodiment, a method for user equipment (UE) operations includes receiving a request to install a virtual range extender (vREX). The vREX is one of a vREX forwarding agent (FA) and vREX UE pair, and the vREX FA is configured to act as a FA for the vREX UE. The method further includes negotiating installation of the vREX.

In accordance with another embodiment a network infrastructure manager includes a processor and a computer readable storage medium storing programming for execution by the processor. The programming includes instructions to select a first user equipment (UE) in a network as a destination UE and select a second UE in the network as a relay UE for the destination UE. The programming includes further instructions to negotiate installation of a virtual range extender (vREX) UE on the destination UE and negotiate installation of a vREX forwarding agent (FA) on the relay UE. The vREX FA is configured to act as a FA for the vREX UE.

In accordance with yet another embodiment, a network device includes a processor and a computer readable storage medium storing programming for execution by the processor. The programming includes instructions to receive a request to install a virtual range extender (vREX). The vREX is one of a vREX forwarding agent (FA) and vREX UE pair, and the vREX FA is configured to act as a FA for the vREX UE. The programming includes further instructions to negotiate installation of the vREX.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described in a specific context, namely software defined network (SDN). Various embodiments may also be applied, however, to other types of managed networks, such as data-center networks, cellular networks, sensor networks, home-entertainment systems, surveillance networks, machine-to-machine networks, or the like.

Various embodiments utilize private infrastructure nodes (e.g., user equipment (UEs)) in a network to emulate dense deployment of traditional network transmission points (e.g., infrastructure forwarding agents (FAs) such as base stations). A network may include a network infrastructure manager that tracks network conditions (e.g., topology, available capacity of UEs, network traffic conditions, and the like) and identifies available UEs to act as range extenders for other UEs. The infrastructure manager may install virtualization software on the available UEs to enable these UEs (referred to as relay UEs) to forward packet transmissions to other UEs (referred to a destination UEs) in the network. The infrastructure manager may also install virtualization software on destination UEs to enable reception of packets from relay UEs. Software defined network (SDN) and software defined protocol (SDP) controllers may configure forwarding tables and provision protocols in the network based on network traffic demand/quality of service (QoS) requirements while integrating relay UEs as FAs. Thus, network throughput demand may be addressed by increasing the density of FAs without the expense of deploying numerous traditional FAs (e.g., base stations). Furthermore, the density of FAs may be adjusted dynamically based on changes in network conditions to provide for an agile network infrastructure.

Figure 1A:
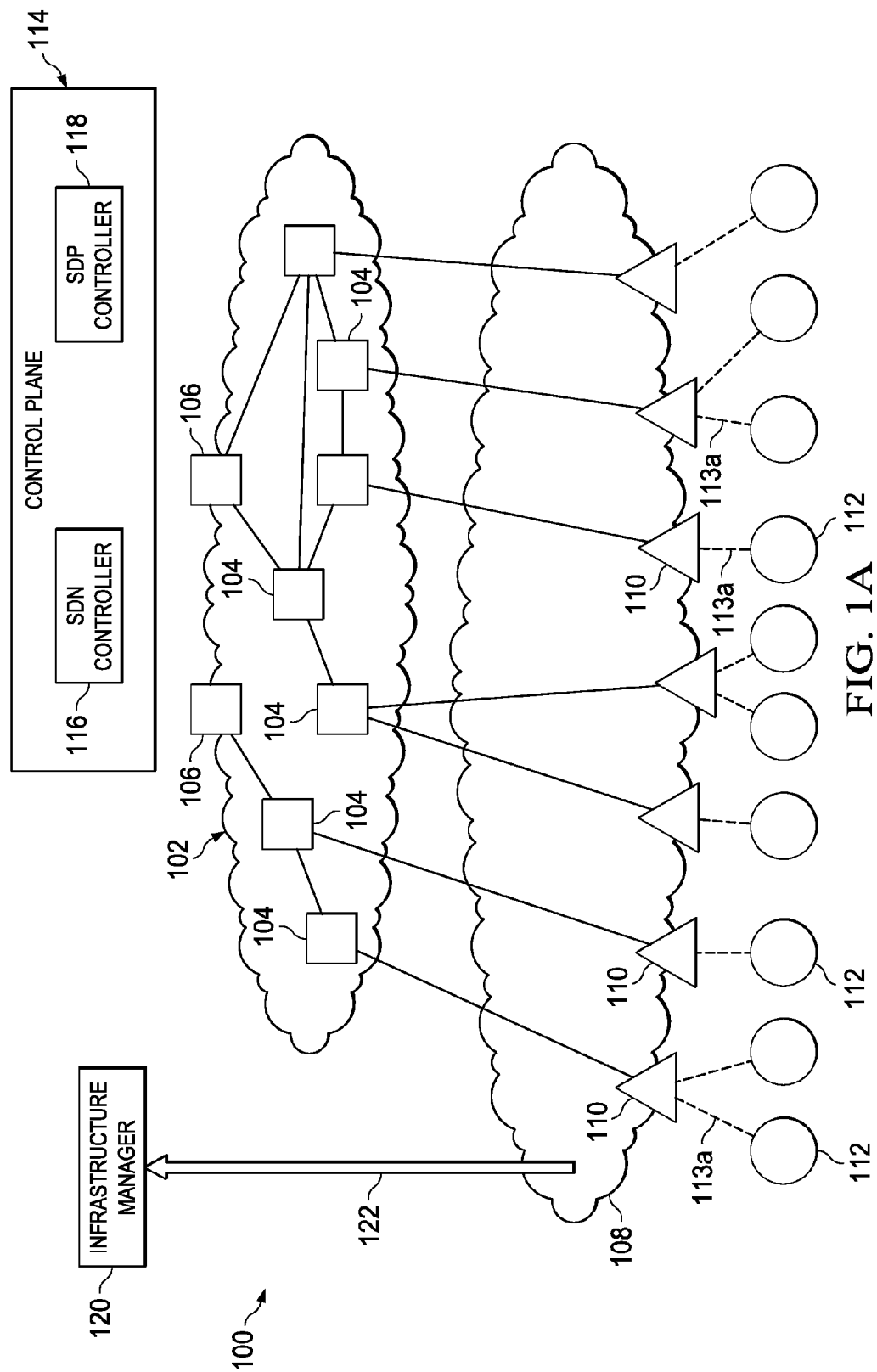
FIGS. 1A through 1C illustrate block diagrams of a network during a network topology forging phase of operation in accordance with various embodiments.

FIG. 1A illustrates a radio access network 100 during a network topology forging phase in accordance with various embodiments. Network 100 includes a core network 102 having core network nodes 104 connected to gateways 106. Gateways 106 provide network connectivity between core network nodes 104 and a backhaul network. Core network nodes 104 may include a layer 3 router, a layer 2 switch, a software-defined protocol network element, or the like. Network 100 further includes an access portion 108 having network-deployed infrastructure FAs 110 (e.g., base stations, long term evolution (LTE) eNode Bs, WiFi access points, and the like) connected to core network nodes 104.

UEs 112 in network 100 may be connected to infrastructure FAs 110 via network access links 113a. UEs 112 may receive downlink packets/transmit uplink packets with infrastructure FAs 110 through network access links 113a using any suitable communications scheme (e.g., LTE, WiFi, or the like). UEs 112 may include non-network deployed infrastructure nodes such as cellphones, laptops, tablet devices, femtocells/picocells, and the like. UEs 112 may be SDN enabled UEs and may include one or more virtual machines for communication with infrastructure FAs 110. Furthermore, UEs 112 may or may not be connected to other networks (e.g., a local home/office network or a different operator's network) in addition to network 100. Access links 113a may be wireless links in accordance with one or more technical standards (e.g., long term evolution (LTE), or IEEE 802.11 (WiFi)) and/or wireline links (e.g., a digital subscriber line (DSL) or a cable connection).

Control functionality in network 100 may be provided by a control plane 114, which may include a SDN controller 116 and a SDP controller 118. SDN controller 116 may dynamically allocate network resources (e.g., by configuring forwarding information bases (FIBs) of network devices) in accordance with traffic conditions/load in network 100. SDP controller 118 may provide protocol provisioning (e.g., by configuring protocol information bases (PIBs) of network devices) for packets transmitted in network 100.

Network 100 may further include an infrastructure manager 120. Infrastructure manager 120 may be implemented as a separate controller, in a software-defined topology (SDT) controller, in a core network node 102, in an infrastructure FA 110, or the like. Furthermore, although FIG. 1A only illustrates on infrastructure manager 120, network 100 may include multiple infrastructure managers 120, for example, managing different geographic areas.

Infrastructure manager 120 performs network topology forging for all of network 100 or a portion of network 100. As part of network topology forging, infrastructure manager 120 may monitor network conditions (as indicated by arrow 122). Monitored conditions in network 100 may include current network topology (e.g., stored in a network topology database), dynamic network conditions (e.g., neighborhood relations of UEs 112, channel quality indicator (CQI) feedback from UEs 112, experienced signal to noise ratios (SINR) of UEs 112, and/or network bandwidth utilization of infrastructure FAs 110 serving UEs 112), historical network conditions (e.g., historical traffic load information or user location data based on geography), historical decisions made by the infrastructure manager, and/or the like. Based on the monitored network conditions, infrastructure manager 120 determines when virtual range extenders (vREX) may be installed on UEs to incorporate relay/destination UEs into network 100. For example, infrastructure manager 120 may select certain UEs 112 (e.g., experiencing poor channel conditions) as destination UEs. Infrastructure manager 120 may further select one or more relay UEs for serving each destination UEs. The relay UEs chosen for a particular destination UE may be determined based on capabilities (e.g., transmission range), neighborhood relations (e.g., expected signal quality), and/or quality of service (QoS) requirements of the destination UE. While a particular configuration and number of network elements (e.g., UEs 112, infrastructure FAs 110, core network nodes 104, and gateways 106) are illustrated in FIG. 1A, other embodiments may include a network having other configurations and/or a varying number of each network element.

Figure 1B:
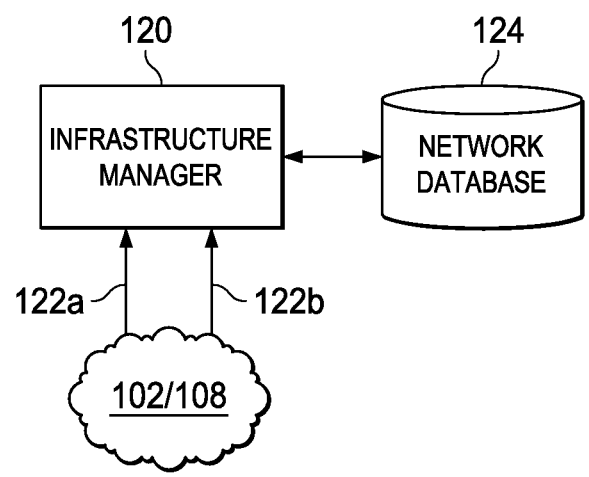

FIG. 1B illustrates a block diagram of an example embodiment of network topology forging by infrastructure manager 120 based on dynamic network conditions. For example, core network 102/access portion 108 may provide infrastructure manager 120 with network status information as indicated by arrow 122a. Network topology information may include the number of UEs 112 in the network, the geographical placement of the UEs, and the like. UEs 112 may also report channel/signal quality feedback information (e.g., CQI feedback) to infrastructure manager 120 as indicated by arrow 122b. Infrastructure manager 120 may store this information in a network status database 124. Based on monitored network topology and channel/signal quality feedback in network status database 124, the infrastructure manager may make long-term SINR estimates for UEs 112 and select UEs 112 (e.g., having poor SINR estimates) as destination UEs. Infrastructure manager 120 may then select relay UEs based on neighborhood relations of the destination UEs. For example, relay UEs may be selected from a pool of UEs within transmission range of each destination UE. In selecting relay UEs, infrastructure manager 120 may prioritize forming a shortest pathway through the relay UE to the destination UE based on an inverse of available throughput capacity. Other signal quality/network status conditions may also apply for selecting and identifying relay UEs and destination UEs. As infrastructure manager 120 detects changes in signal quality (e.g., based on received feedback), selection of relay UEs and/or destination UEs may be dynamically reconfigured and updated.

Figure 1C:
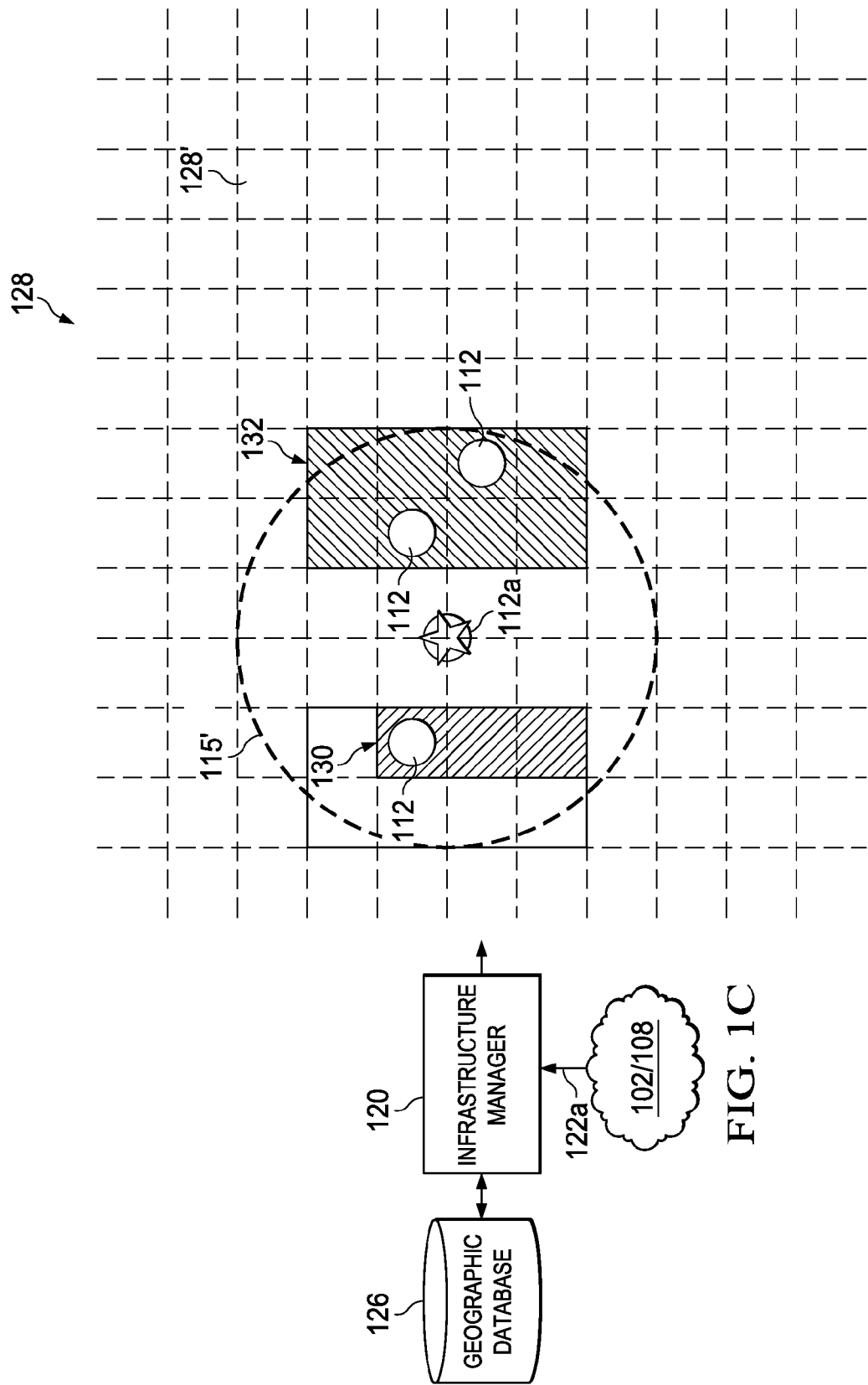

FIG. 1C illustrates a block diagram of an example embodiment of network topology forging by infrastructure manager 120 based on historic network conditions. For example, core network 102/access portion 108 may provide infrastructure manager 120 with network topology information as indicated by arrow 122a. Network topology information may include the number of UEs 112 in the network, the geographical placement of the UEs, and the like. However, in the embodiment illustrated by FIG. 1C, infrastructure manager 120 may not receive dynamic channel/signal quality feedback from UEs 112. Instead, infrastructure manager 120 may receive information (e.g., from a geographic database 126) about historic network conditions of network 100. In various embodiments, the historic network conditions information may account for and predict network conditions (e.g., estimated SINR, CQI, historical spectral efficiency, peak data rates, low data rates, latency performance, and the like) based on geography, the number of UEs in a network, time of day, days of the week, special occasions, traffic schedules (e.g., transit schedules/traffic light schedules), and/or the like.

Based on geographical network status information and historic network conditions, infrastructure manager 120 may generate a bin map 128. Bin map 128 divides network 100 geographically into bins 128'. Bin map 128 may also divide at least a portion of bins 128' into available bins 130 or blocked bins 132. UEs 112 located in available bins may be used as relay UEs (e.g., due to predicted good signal quality) whereas UEs 112 located in blocked bins may not be available as relay UEs (e.g., due to predicted poor signal quality). Alternatively, bins 128' may be divided to reflect different priorities of availability for selecting a relay UE. Signal strength/quality of UEs in network 100 may be predicated based on their geographical location in a corresponding bin 128'. Infrastructure manager 120 may identify a destination UE 112a, for example, based on a UE 112's location in a particular bin. Infrastructure manager 120 may further choose a relay UEs by identifying potential UEs 112 located in an available bin 130 within transmission range (e.g., indicated by circle 115) of the destination UE 112a. Infrastructure manager 120 may not select UEs 112 located in blocked bins 132 as relay UEs even if such UEs 112 are within transmission range of destination UE 112a. As UEs 112 move geographically in and out of bins 128', the selection of destination UEs and relay UEs may also change accordingly.

Figure 2:
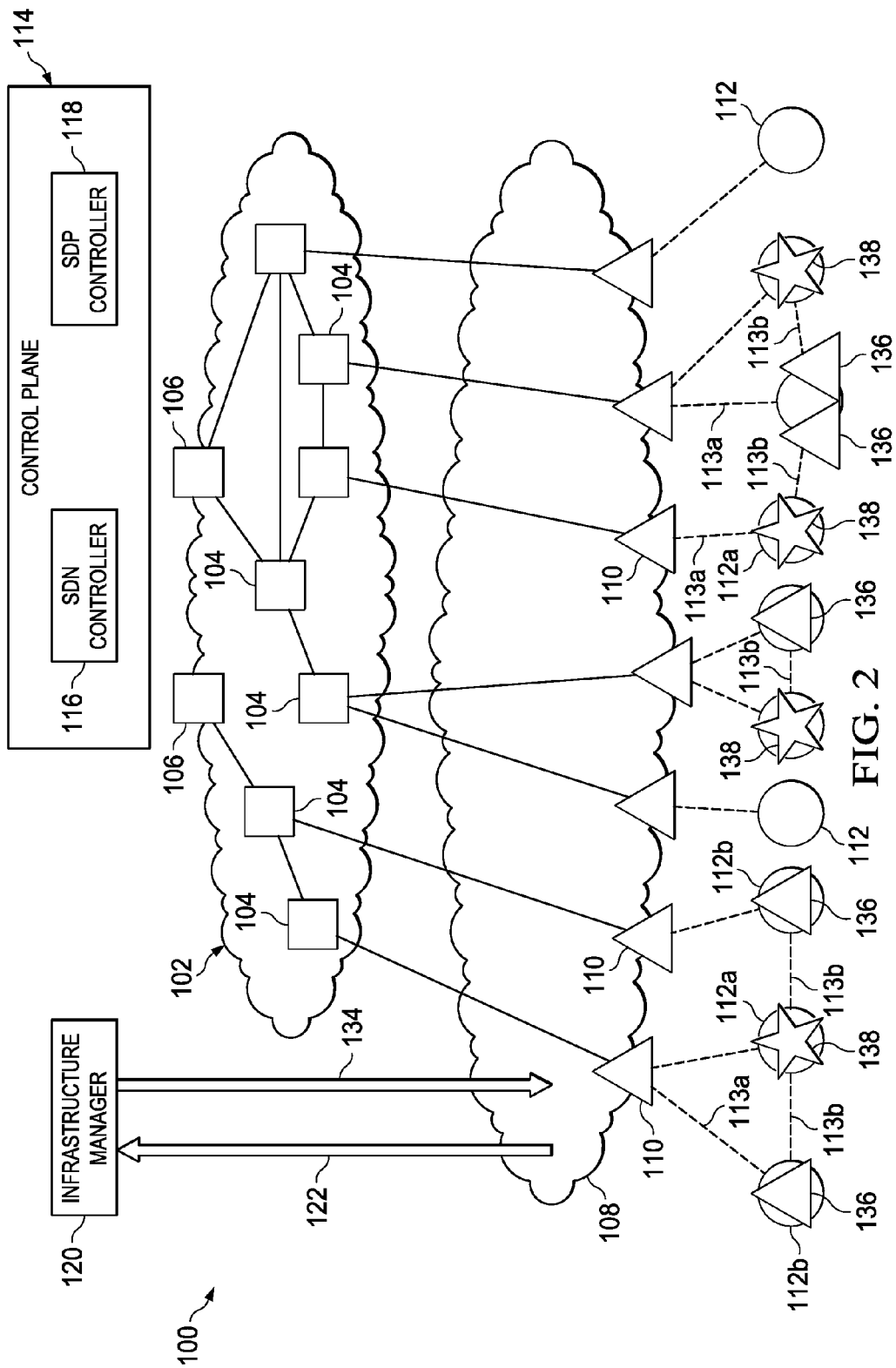
FIG. 2 illustrates a block diagram of the network during a virtual range extender (vREX) initiation phase of operation in accordance with various embodiments.

FIG. 2 illustrates network 100 during a software installation phase in accordance with various embodiments. Based on network topology forging results described in FIGS. 1A through 1C, infrastructure manager 120 may form destination UE 112a/relay UE 112b pairs in network 100. Infrastructure manager 120 may negotiate installation of virtual range extenders (vREX) on relay UEs 112b (e.g., vREX FA 136) and on destination UEs 112a (e.g., vREX UE 138) as indicated by arrow 134. Each relay UE 112b may serve one or more destination UEs 112a through virtual access links 113b. In various embodiments, virtual access links 113b are the virtual backbone links created to relay UEs 112b. Similarly, each destination UE 112a may be served by one or more relay UEs 112b. Still other UEs 112 in network 100 may not have vREX installed and may not be configured as a destination UE 112a or a relay UE 112b.

In various embodiments, vREX is a virtual SDP-enabled element installed on applicable UEs 112. vREX allows relay UEs 112b to improve the quality of service/quality of experience (QoS/QoE) of destination UEs 112a by providing additional/improved access links to destination UEs 112a. vREX FA 136 enables a relay UE 112b to act as FA serving vREX UE 138. For downlink transmissions, a vREX FA 136 may receive and forward packets to a vREX UE 138 installed on a destination UE through virtual access link 113b. During uplink transmissions, the vREX FA 136 receives packets from the vREX UE 138 and forwards these packets to infrastructure FAs 110. vREX FA 136 may use existing wireless hardware of a relay UEs 112b to receive and transmit packets addressed to destination UEs 112a served by the relay UEs 112b. Receiving hardware and transmitting hardware for a destination UE/relay UE 112a/112b pair may be the same or different. Furthermore, virtual access links 113b be over wireless technologies (e.g., 3G, 4G, LTE, LTE-A, device-to-device (D2D) communications, 802.11, 802.16, and/or 802.15) or wireline technologies (e.g., ethernet and/or 802.3).

vREX FAs 136 may be implemented as virtual machines on relay UEs 112b. vREX FA 136 may enable bidirectional privacy, security, and resource sharing between relay UEs 112b and destination UEs 112a. Installation of vREX FAs 136 may include installing a forwarding information base (FIB) on the relay UEs 112b. A relay UE 112b may recognize packets intended for an installed vREX FA 136, for example, based on entries in the FIBs as configured by SDN controller 116. When a relay UE 112b detects a packet is intended for its vREX FA 136, the packet may be passed to the vREX FA 136. The vREX FA 136 may process the packet (e.g., by adding applicable tunneling protocol headers to the packet) and convert the passenger packet to a vREX transport protocol for transmission across virtual access link 113b. The vREX transport protocols applied may be based on QoS requirements of the destination UE (e.g., a desired security/encryption level). The applied protocols may be configured in a protocol information base (PIB) configured by SDP controller 118. The vREX transport protocol packets may then be handed back to the operating system (OS) of relay UEs 112b for transmission. Alternatively, the vREX transport protocol packets may be handed directly to the transmission hardware of relay UEs 112b for transmission. The interaction between vREX FA 136 and a relay UE 112b's OS/hardware may depend on applicable implementations used and permissions received during installation of the vREX FA 136. Each relay UE 112b may have one or more vREX FAs 136 for transmitting packets to one or more destination UEs 112a. Although each vREX FA 136 is described as serving a single vREX UE 138, in various alternative embodiments a single vREX FA 136 may serve multiple vREX UEs 138, for example, for both single-cast and multi-cast transmissions. vREX UE 138 may be implemented as virtual machines on destination UEs 112a. vREX UE 138 is the end-point for packet transmissions of a vREX FA 136/vREX UE 138 pair. vREX UE 138 receives packet transmissions from a vREX FA 136 using protocols configured by SDN controller 116 and SDP controller 118. During reception, vREX UE 138 may extract passenger data packets (e.g., readable data) from received vREX transport protocol packets, for example, by removing/popping applicable protocols. vREX UE 138 may then hand over the passenger data packets to the OS of the destination UE 112a. During transmission (e.g., uplink), vREX UE 138 may convert passenger data packets into vREX transport protocol packets, for example, by pushing/adding one or more protocols on the passenger data packets. vREX UE 138 may then hand over the transport protocol packets to the destination UEs 112a's operating system or transmission hardware for transmission to a vREX FA 136. Multiple vREX UEs 138 may co-exist on a single destination UE 112a for receiving packets from multiple paired vREX FAs 136 on different relay UEs 112b. Destination UEs 112a may perform load balancing of uplink traffic between the OS's packets and packets from one or more installed vREX UEs 138 as instructed by SDN controller 116. Although each vREX UE 138 is described as being served by a single vREX FA 136, in various alternative embodiments a single vREX UE 138 may be served by multiple vREX FAs 136, for example, for both single-cast and multi-cast transmissions.

Infrastructure manager 120 may negotiate the installation of vREX on relay UEs 112*b* and destination UEs 112*a*. For example, infrastructure manager 120 may offer incentives to relay UEs 112*b* to accept installation of vREX FAs 136. Incentives may include reduced price for wireless access on the network, higher priority for relay UE 112*b*'s traffic, and the like. Furthermore, infrastructure manager 120 may have access to a UE capability database, which contains the capabilities of various UEs 112 in network 100. Based on the UE capability database, infrastructure manager 120 may install vREX (e.g., either vREX FA or vREX UE) on certain UEs 112. For example, infrastructure manager 120 may only install vREX on UEs 112 having software/hardware (e.g., CPU/transmission capabilities) over a configurable threshold.

When UEs 112 receive requests from infrastructure manager 120 for vREX installation, UEs 112 may verify the validity of the software. For example, UEs 112 may verify the software by checking the software's checksum value, which may be a MD5 checksum, a SHA-2 checksum (e.g., SHA-256), some other hash function checksum, or the like. Alternatively or in addition to checksum values, infrastructure manager may include a digital signature in the vREX software for verification. For example, infrastructure manager 120 may add a digital signature of the software's source and generate a checksum value at the vREX. Upon reception, UE 112 may check the checksum value and verify the digital signature. The software's source may be a virtual network provider, the owner of infrastructure manager 120, the actual network provider, or the like. The request may indicate whether vREX FA 136 or vREX UE 138 is to be installed. Once verified, UEs 112 may prompt its operator (e.g., an end user) to install vREX. UEs 112 may then transmit a positive or negative acknowledgment of installation as applicable to infrastructure manager 120. In some embodiments, operators of UEs 112 (e.g., end users) may pre-select their preferences for their device to automatically accept or reject vREX installation. In such embodiments, vREX may be installed without additional prompting after verification of an installation request's validity.

Figure 3:
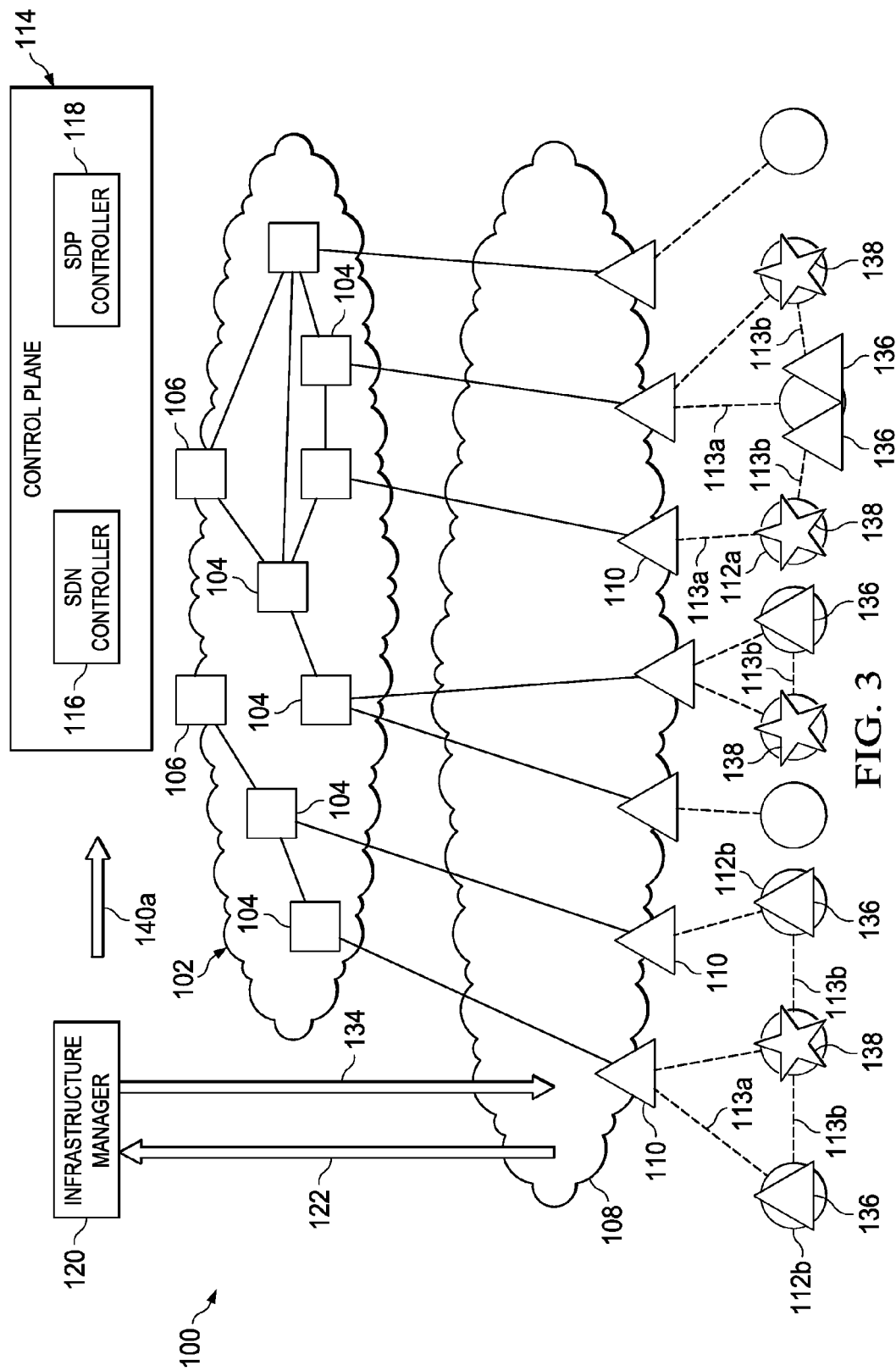
FIG. 3 illustrates a block diagram of a network informing a control plane of network topology phase of operation in accordance with various embodiments.

After infrastructure manager 120 installs vREX on relay UEs 112*b* and destination UEs 112*a* in network 100, infrastructure manager 120 updates the network topology to include vREX FA 136 and vREX UE 138 pairs. This new network topology is then sent to the control plane 114 as indicated by arrow 140*a* of FIG. 3.

Figure 4:
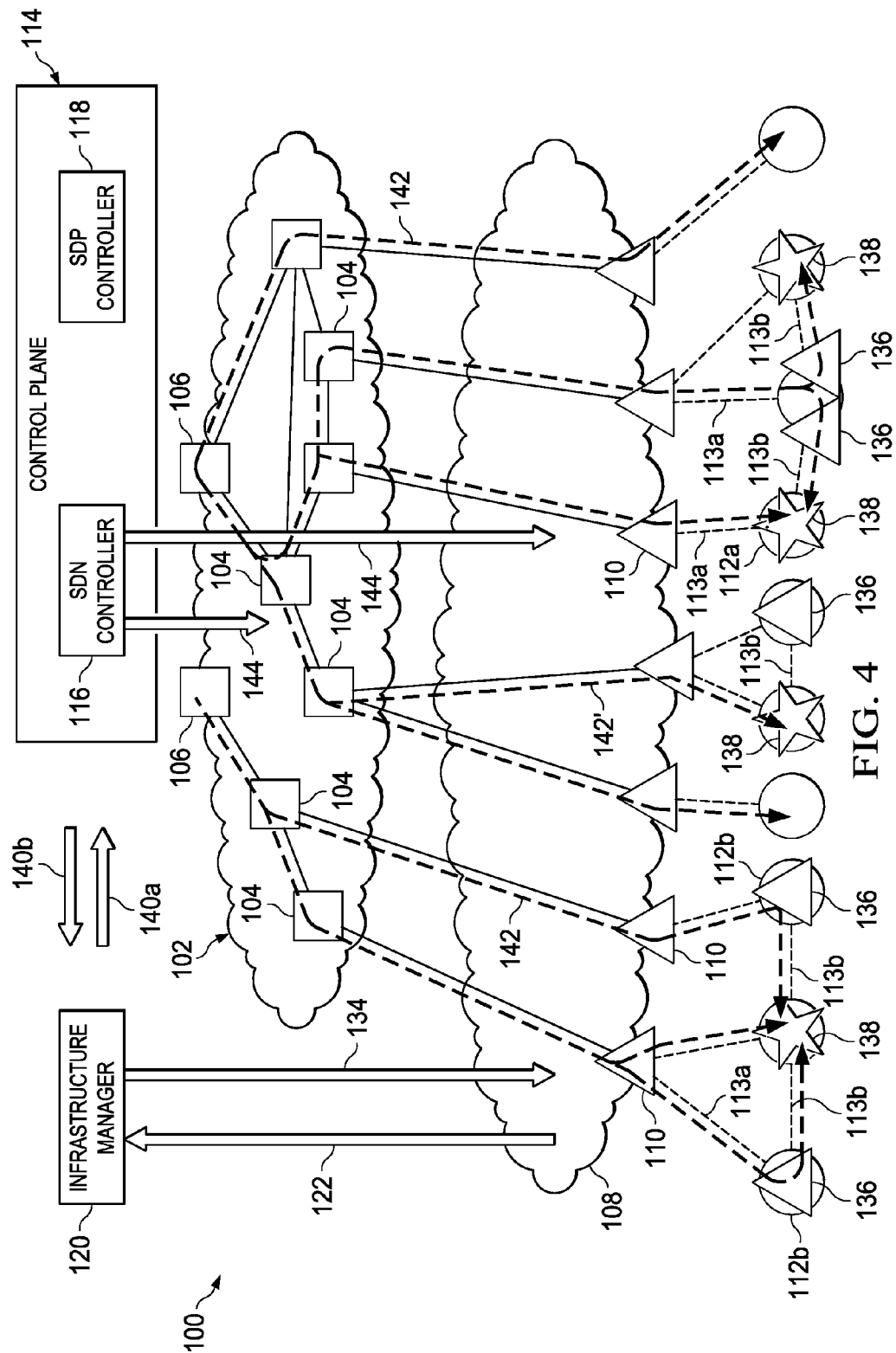
FIG. 4 illustrates a block diagram of a network during a network forwarding path configuration phase of operation in accordance with various embodiments.

FIG. 4 illustrates a block diagram of SDN controller 116 allocating network resources by configuring forwarding paths 142 for transmitting packets from gateways 106 to UEs 112 (including destination UEs 112*a*) in network 100. SDN controller 116 may allocate network resources by calculating transmission forwarding paths 142 using a network topology which incorporates vREX FA 136 and vREX UE 138 pairs as transmission\reception points in addition to core network nodes 104, infrastructure FAs 110, and UEs 112. SDN controller 116 may receive information regarding network status (e.g., available throughput rates, utilization on links, queuing status on links, packet loss rates on links, latency on the links) of network access links 113*a* or backbone links between network devices (e.g., infrastructure FAs to UEs 112) and virtual access links 113*b* between relay UEs 112*b* and destination UEs 112*a*. Based on network traffic conditions, SDN controller 116 may perform traffic engineering to determine a desired set of forwarding paths 142 for transmitting packets in network 100. For example, SDN controller 116 may perform traffic engineering based on network status and traffic demand. The demand may be explicitly communicated by a UE 112 (e.g., a destination UE 112*a*), explicitly communicated by traffic sources outside of the network, predicted based on UE behavior (including UE traffic behavior), inspection of traffic streams of UEs 112 in network 100, or the like. SDN controller 116 may configure FIBs at core network nodes 104, infrastructure FAs 110, and relay UEs 112*b* with entries for forwarding paths 142 (as indicated by arrows 144). Entries in the FIBs inform each network node which next network node to forward a packet (sometimes referred to as a next hop address). SDN controller 116 may also configure priorities for sending different packets in network 100 at core network nodes 104, infrastructure FAs 110, and/or relay UEs 112*b*. Forwarding paths 142 may or may not utilize available vREX FAs 136 and vREX UEs 138 pairs. For example, forwarding path 142' may directly transmit packets from an infrastructure FA 110 to a UE 112 despite the availability of a virtual access link 113*b*.

SDN controller 116 may further inform infrastructure manager 120 about the configured traffic forwarding paths 142 as indicated by arrow 140*b*. Generally, infrastructure manager 120 configures a network topology having numerous vREX FAs 136/vREX UEs 138, which allows SDN controller 116 to have increased flexibility and granularity during traffic engineering. However, as discussed above, some vREX Fas 136/vREX UEs 138 may be unused for traffic forwarding. SDN controller 116 may inform infrastructure manager 120 of forwarding paths 142, so that the infrastructure manager 120 may adjust vREX if desired. For example, infrastructure manager 120 may suspend unused vREX to conserve resources on relay UEs 112*b*/destination UEs 112*a*. As network status conditions change, SDN controller 116 may reconfigure forwarding paths 142 accordingly. Any changes to forwarding paths 142 may be signaled to infrastructure manager 120, and infrastructure manager 120 may update vREXs in the network accordingly. For example, infrastructure manager 120 may reactivate a suspended vREX based on changes to forwarding paths 142.

Figure 5:
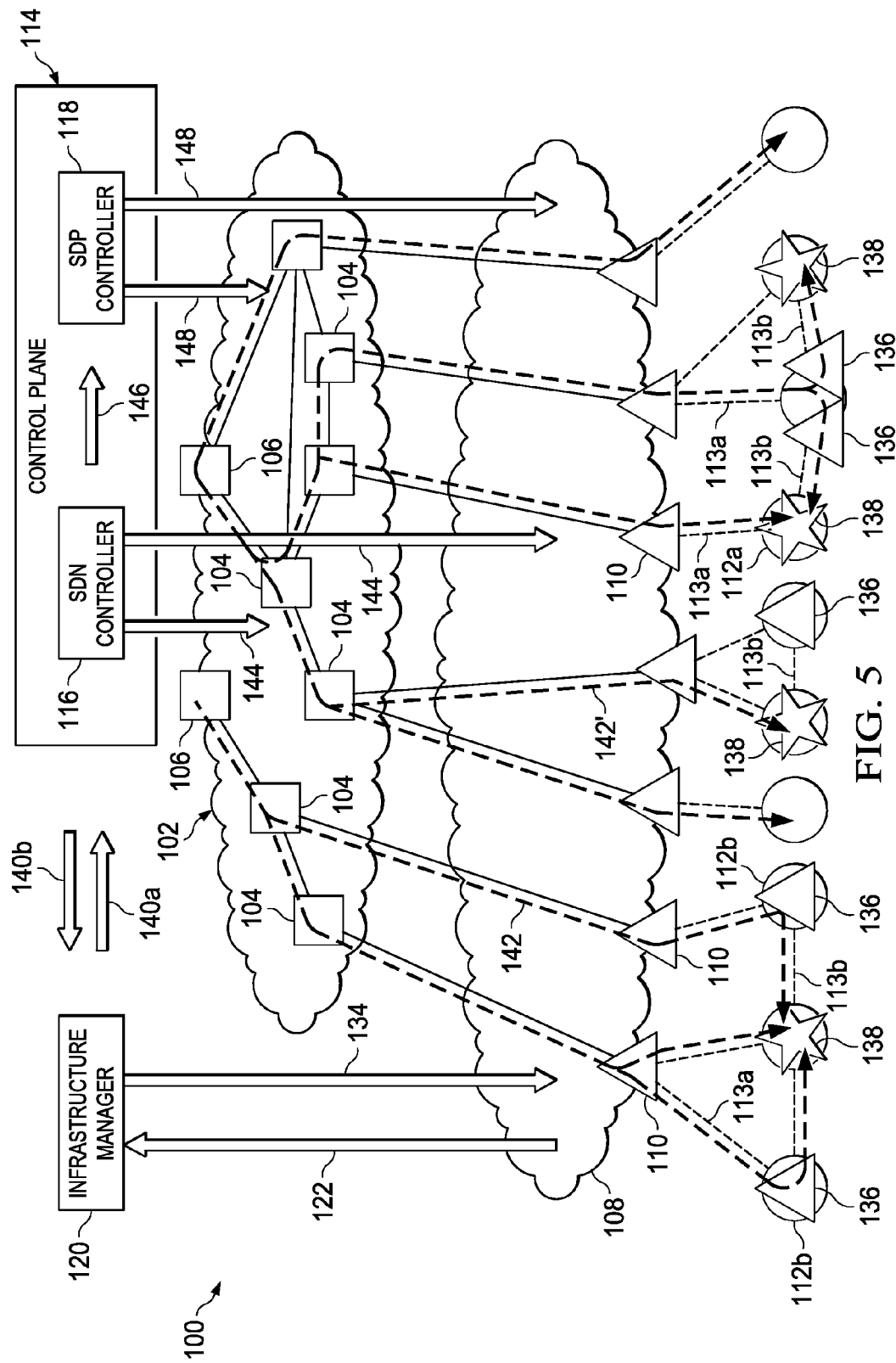
FIG. 5 illustrates a block diagram of a network during a protocol provisioning phase of operation in accordance with various embodiments.

FIG. 5 illustrates a block diagram of network 100 during a protocol provisioning phase of operations in accordance with various embodiments. SDP controller 118 may install protocol software (e.g., for referral in PIBs) in SDP-enabled elements (e.g., gateways 106, core network nodes 102, SDP-enabled infrastructure FAs 110, and SDP-enabled UEs 112), including virtual SDP-enabled elements (e.g., vREX). SDP controller 118 may further configure PIB entries in network 100, for example, based on QoS requirements of various transmissions (e.g., desired security/encryption levels) as indicated by arrows 148. In network 100, protocols may be applied on a per-packet basis. For example, protocol headers may be pushed/added and popped/removed as determined by SDP controller. Therefore, PIB entries may instruct SDP-enabled elements about what protocols to push/pop from a packet before transmission/after reception. SDP controller 118 determines various protocols for packet transmission and selects nodes in network 100 for implementing the protocols.

In some embodiments, SDN controller 116 may provide SDP controller 118 with traffic engineering, resource allocation results (e.g., the configuration of forwarding paths 142) as indicated by arrow 146. Based on the configuration of forwarding paths 142, SDP controller 118 may configure a protocol suite for each forwarding path 142. For example, if a destination UE 112*a* has more than one transmission path to it, SDP controller 118 may configure a multipath protocol to the destination UE 112*a*. In such embodiments, SDN controller 116 and SDP controller 118 may calculate multiple iterations of forwarding paths/protocol suits based on network conditions. For example, if suitable protocols are not available on an SDN controller 116 selected path (e.g., a destination UE cannot support a multipath protocol), the SDN controller 116 may reconfigure transmission forwarding paths 142. Although FIGS. 4 and 5 illustrate the SDN controller 116 performing traffic engineering prior to SDP controller 118 provisioning protocols, in other embodiments, the protocol provisioning may occur prior to traffic engineering. Furthermore, although FIGS. 1A through 5 illustrate particular configurations of network 100 and forwarding paths 142, other configurations may also be used in other embodiments.

Figure 6A:
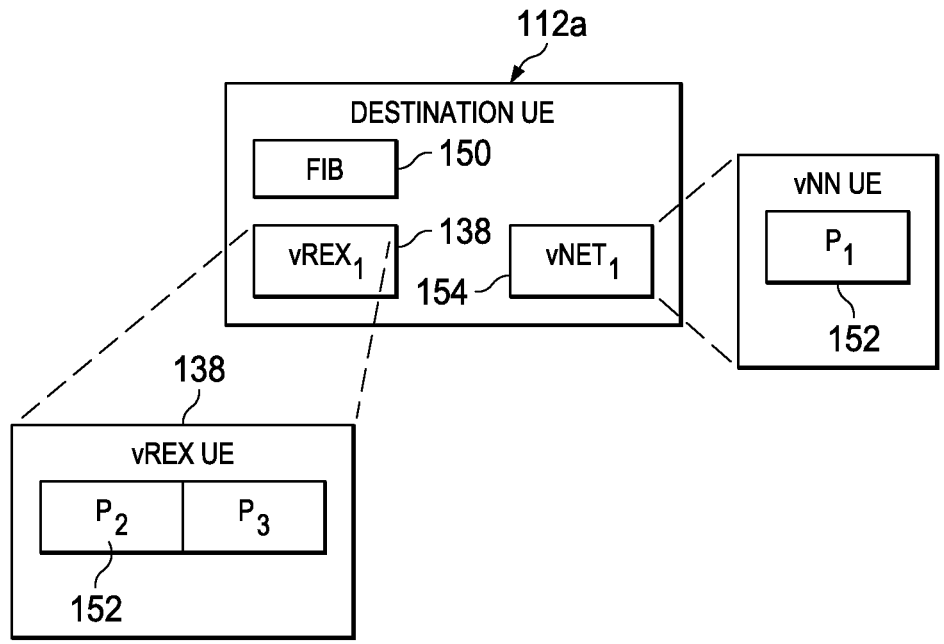
FIGS. 6A and 6B illustrate block diagrams of user equipment (UE) having vREX in accordance with various embodiments.
Figure 6B:
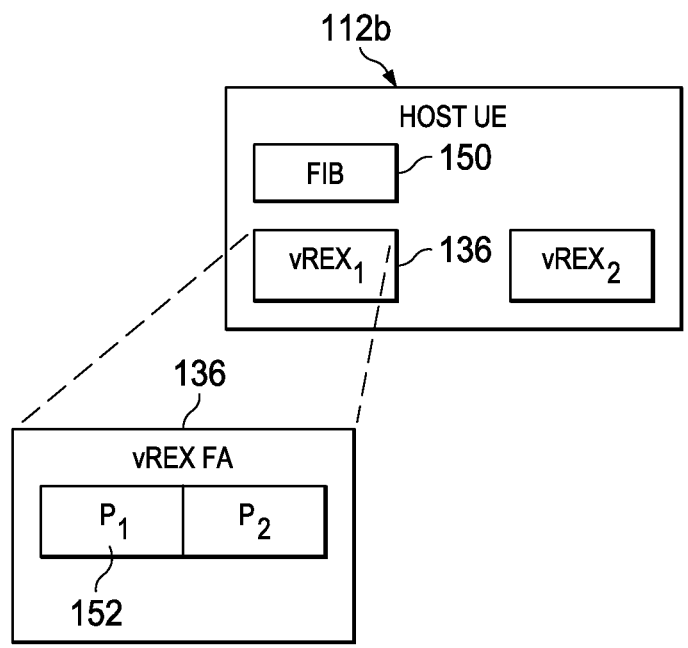

FIGS. 6A and 6B illustrate block diagrams of a destination UE 112*a* and a relay UE 112*b*, respectively, having vREXs installed. As illustrated by FIG. 6A, destination UE 112*a* may include a FIB 150*a*, vREX UE 138, and, optionally, a virtual network element (vNET) 154. In addition to vREX, UE 112*a* may also participate in some other virtual network and may include a virtual network UE (vNN UE) element, which may be a different type of virtual machine than vREX. Although only one vNET 154 is illustrated, destination UE 112*a* may include any number of vNETs 154. FIB 150*a* instructs destination UE 112*a* where to transmit packets, for example, for uplink transmissions and/or where to pass received packets. For example, FIB 150*a* may instruct destination UE 112*a* about which packets pass to an installed vREX UE 138 and/or a SDP-enabled network receiver (e.g., vNET 154). Entries in FIB 150*a* may be configured by SDN controller 116. vREX UE 138 allows destination UE 112*a* to receive/transmit packets from a paired vREX FA 136 on a relay UE 112*b*. vNET 154 allows destination UE 112*a* to receive packets from an SDP-enabled from other virtual networks. Both vREX 138 and vNET 154 may include protocol software 152, which may be used as instructed by the PIB in the vREX 138/vNET 154 on what protocols to pop for received packets and/or what protocols to push for uplink packet transmissions. Protocols 152 may be provisioned by SDP controller 118. Protocol provisioning for vREX 138 and vNET 154 may be the same or different. Furthermore, destination UE 112*a* may include more than one vREX 138.

As illustrated by FIG. 6*b*, relay UE 112*b* may include a FIB 150*b* and one or more vREX FAs 136. Relay UE 112*b* may also include one or more vNET elements 154. FIB 150*b* instructs relay UEs 112*b* where to pass packets, for example, to a particular vREX FA 136 for transmission to a destination UE 112*a*. Entries in FIB 150*b* may be configured by SDN controller 116. FIB 150*b* may also allow relay UE 112*b* to identify which packets to keep and which packets to forward to a destination UE 112*a*. vREX FA 136 allows relay UE 112*b* to receive/transmit packets from a paired vREX UE 138 on a destination UE 112*a*. vREX FA 136 may include protocol software 152, which may determine which protocols may be applied to convert a passenger data packet to a vREX transport protocol packet for transmission to vREX UE 138. Entries in PIB 152 may be provisioned by SDP controller 118 in accordance with QoS/QoE requirements of a virtual access link 113*b* between the paired vREX FA 136/vREX UE 138. Other considerations for provisioning entries in PIB 152 may also apply.

As previously discussed, vREX FAs 136 and vREX UEs 138 may be dynamically reconfigured by infrastructure manager 120 based on changes in network topology (e.g., UE movement), network traffic conditions, QoS/QoE requirements, UE channel conditions, and the like. Because vREX FAs 136 and vREX UEs 138 may be configured in pairs, both vREX FA/UE may be reconfigured. For example, if a destination UE 112*a* does not require vREX FA 136 transmissions (e.g., due to improved channel conditions), the applicable vREX UE 138 may be removed. Alternatively, if vREX FA 136 assistance is still desired, the installed vREX UE 138 may be provisioned to use a different set of wireless protocols to receive packets from a different vREX FA 136. That is, the installed vREX UE 138 may be paired with a different vREX FA 136.

Figure 7A:
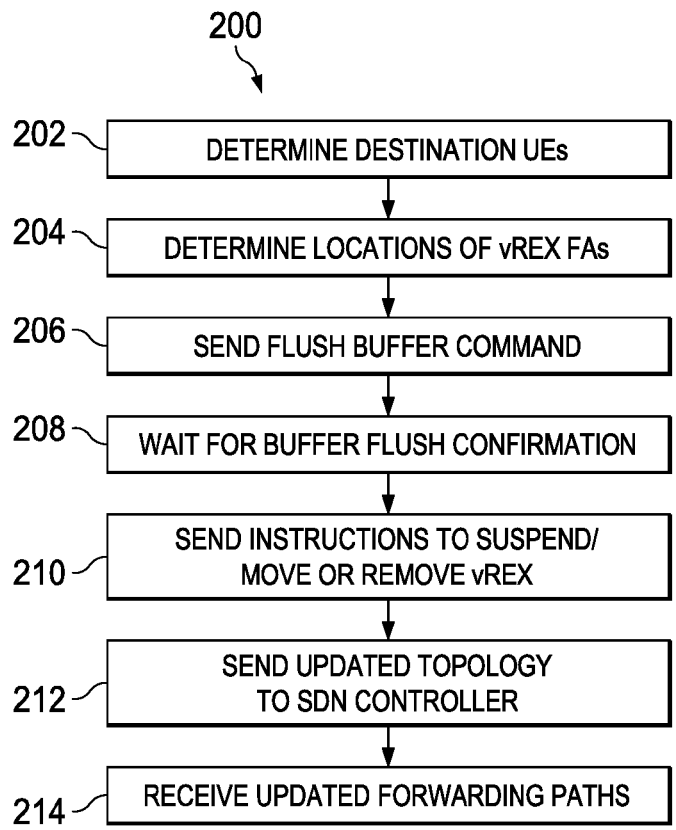
FIGS. 7A and 7B illustrate flow charts of vREX transferring in accordance with various embodiments.

FIG. 7A illustrates a flow chart illustrating a process 200 for infrastructure manager 120 operations for reconfiguring vREX network topology. In step 202, infrastructure manager 120 identifies destination UEs 112*a* in network 100, for example, based on changes in short term network conditions (e.g., received feedback for a change in channel conditions) and/or geographic changes (e.g., geographic movement of a UE to a different bin 128'). The destination UEs 112*a* may be the same or different as previously selected. In step 204, infrastructure manager 120 determines locations of vREX FAs 136 for serving the destination UEs 112*a*. Considerations for determining new locations for vREX FAs 136 may be substantially similar to considerations of choosing initial vREX FAs 136 (e.g., based on available capacity of access links).

In step 206, infrastructure manager 120 sends a flush buffer command to any vREX FAs 136/vREX UEs 138 that will be reconfigured. Upon receiving the flush buffer command, the applicable vREX may either finish transmitting any packets in their buffer and/or remove remaining packets in the buffer. In step 208, infrastructure manager 120 waits for buffer flush confirmation from applicable vREXs. After infrastructure manager 120 receives the buffer flush confirmation, in step 210, infrastructure manager 120 sends a command to suspend applicable vREXs. The vREXs may then be moved to another UE 112 or removed based on the new network topology. For example, a number of vREXs may be uninstalled from UEs 112. As another example, infrastructure manager 120 may negotiate the installation of vREXs on different UEs 112. In step 212, infrastructure manager 120 may send an updated network topology to the control plane (e.g., SDN controller 116 and SDP controller 118). The updated network topology may trigger SDN controller 116 to perform traffic engineering using the new network topology. SDN controller 116 may perform traffic engineering and determine new transmission forwarding paths 142. The updated network topology may also trigger SDP controller 118 to re-provision protocols in network 100. In step 214, infrastructure manager 120 may receive the new transmission forwarding paths 142 from the control plane. Infrastructure manager 120 may update vREX in the network based on the new transmission forwarding paths 142. For example, infrastructure manager 120 may suspend vREX that are not used in the new transmission forwarding paths 142.

Figure 7B:
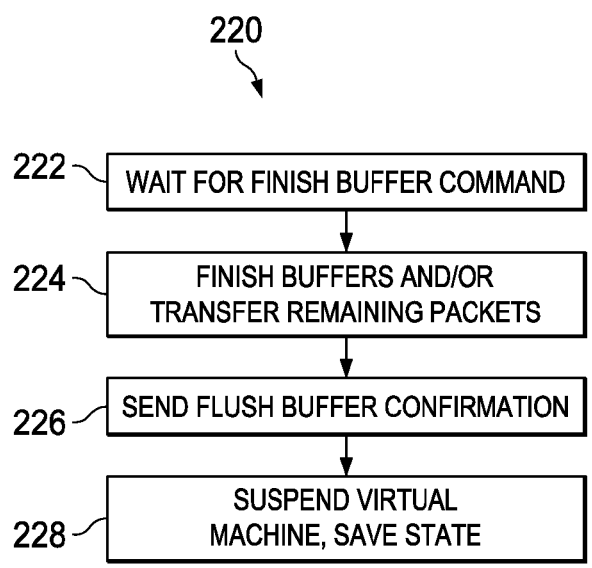

FIG. 7B illustrates a flow chart illustrating a process 220 for UE 112 operations for reconfiguring vREX network topology. UE 112 may operate vREXs until a flush buffer command is received from infrastructure manager 120 in step 222. In step 224, UE 112 may finish transfer buffers and/or transfer remaining packets to another FA for transmission or drop packets from its buffer. In step 226, UE 112 sends a flush buffer confirmation to infrastructure manager 120 to confirm the installed vREX has finished any pending operations. In step 228, UE 112 may receive a suspend VM command from infrastructure manager 120. UE 112 may suspend vREXs operations. UE 112 may save any VM operational states. Saved states may be maintained even when the vREX is moved to another UE device. Alternatively, the vREX may be uninstalled and removed from network 100. If UE 112 has more than one vREX installed, the transfer operations may apply to all vREXs installed or only a subset of vREXs installed. Thus, as described in FIGS. 7A and 7B, network topology in a network may be updated by reconfiguring vREXs based on instructions from infrastructure manager 120.

Figure 8:
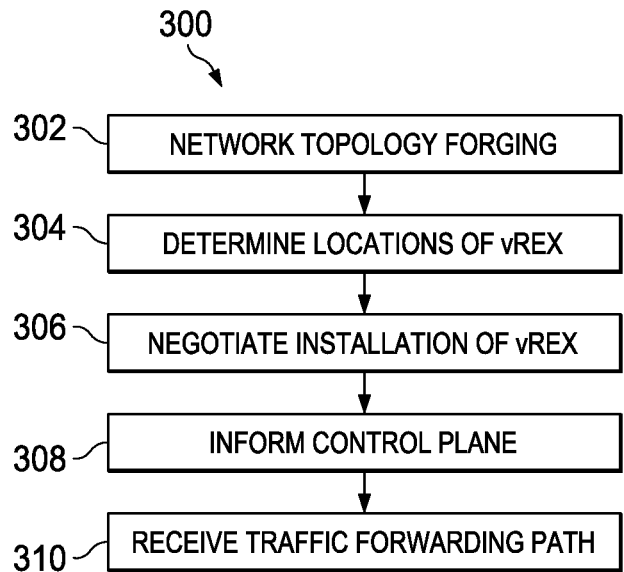
FIG. 8 illustrates a flow chart of network infrastructure manager operations in accordance with various embodiments.

FIG. 8 illustrates a process flow 300 illustrating infrastructure manager 120 operations for incorporating vREX FAs 136 and vREX UEs 138 in a network. Infrastructure manager 120 may perform network forging in network 100. Network forging may include identifying destination UEs in a network and selecting one or more relay UEs for each destination UE. In step 302, infrastructure manager 120 determines when vREX should be incorporated in a network and determines where vREXs may be implemented, for example, by selecting one or more UEs 112 to be destination UEs 112a. Destination UEs 112a may be selected based on network topology, dynamic channel quality feedback (e.g., CQI feedback) received from UEs 112, historic network conditions (e.g., based on a geographic database and generated bin map), or the like. Then in step 304, one or more relay UEs may be selected for each destination UEs. Relay UEs may be selected based on throughput capacity of UE 112s within transmission range of a destination UE or by consulting a database of past UE performance in nearby locations (as described with respect to FIG. 1C).

In step 306, infrastructure manager 120 negotiates installation of vREX FAs 136 on relay UEs 112b and vREX UEs 138 in destination UEs 112a. vREX FAs 136 may use a relay UE 112b's transmission hardware to receive packets intended for destination UEs 112a and transmit the packets to vREX UEs 138 at the destination UEs 112a. Infrastructure manager 120 may offer incentives to potential relay UEs 112b (e.g., connection discounts, increased priority for a relay UE's traffic, or the like) for relay UEs 112b to accept installation of vREX FAs 136. In step 306, infrastructure manager 120 informs control plane 114 about the network topology incorporating vREXs. SDN controller 116 may use the new network topology to perform traffic engineering and configure forwarding paths in the network. SDP controller 118 may use the network topology to provision protocols in the network, for example, based on QoS/QoE requirements.

In step 308, infrastructure manager 120 may receive transmission forwarding paths 142 from the control plane. Infrastructure manager 120 may update vREX in the network based on transmission forwarding paths 142. For example, infrastructure manager 120 may suspend vREX that are not used in transmission forwarding paths 142. Thus, infrastructure manager 120 may configure vREXs in a network to increase FA density in a network without the cost of deploying permanent infrastructure FAs 110. Furthermore, as traffic conditions in the network changes (e.g., channel quality changes, UE movement, and the like), infrastructure manager 120 may reconfigure the network topology to address these network changes.

Figure 9:
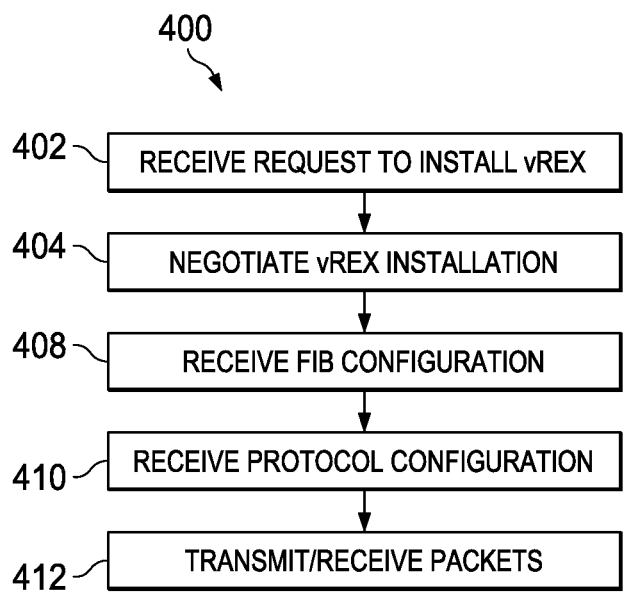
FIG. 9 illustrates a flow chart of UE operations in accordance with various embodiments.

FIG. 9 illustrates UE operations in a network having vREX in accordance with various embodiments. In step 402, UE 112 receives a request to install a vREX from infrastructure manager 120. The vREX may be a vREX FA 136 or a vREX UE 138. Next, in step 404, UE 112 negotiates installation of the vREX. For example, UE 112 may verify the request, prompt the operator (e.g., an end-user) about the request, and send installation results to infrastructure manager 120.

In step 408, UE 112 receives FIB configurations from SDN controller 116. In step 410, UE 112 may receive protocol configurations from SDP controller 118. If vREXs were installed, the FIB and protocol configurations may include provisions for the vREX. For example, the FIB may allow the UE 112 to identify packets to pass to the vREX for transmission. Furthermore, the protocol configurations may identify protocols to push/pop for converting passenger packets to/from vREX transport protocol packets used during vREX transmissions. In various embodiments, packets passed between vREX FA 136/vREX UE 138 pairs may be processed and converted into vREX transport protocol packets for transmission. SDP controller 118 may configure the vREX transport protocols. In step 412, UE 112 transmits/receives packets based on entries in the FIB and provisioned protocols.

Figure 10:
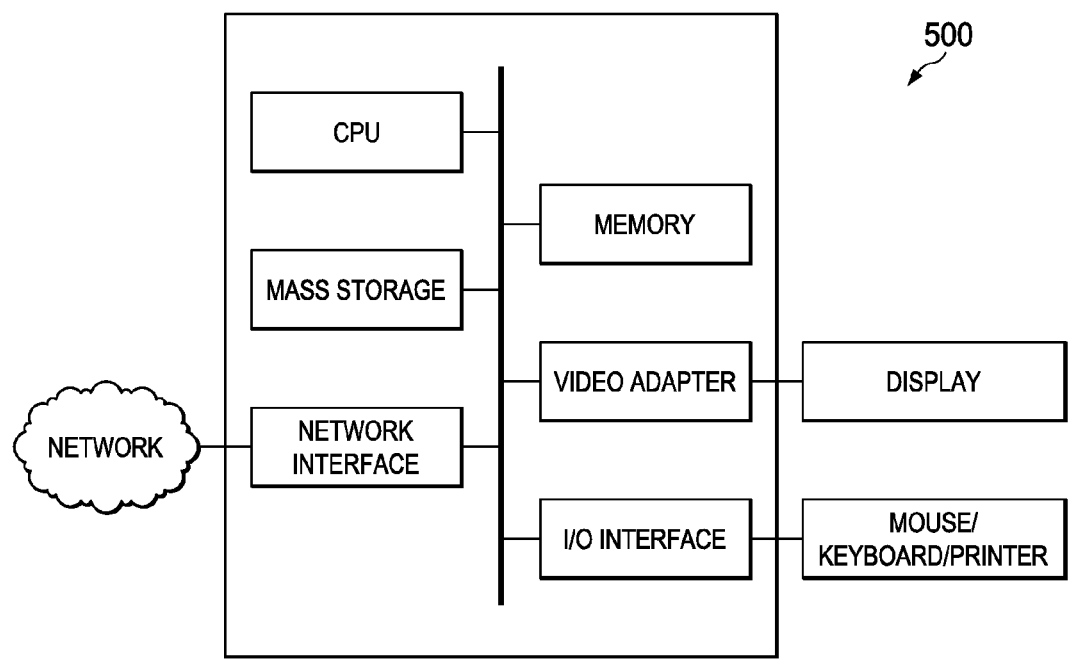
FIG. 10 illustrates a computing platform that may be used for implementing, for example, the devices and methods described herein, in accordance with various embodiments.

FIG. 10 is a block diagram of a processing system 500 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for network infrastructure manager operations in a network comprising:
    estimating long-term signal to noise ratios (SINRs) for user equipments (UEs) in the network in accordance with network topology information of the network and channel quality feedback from UEs in the network;
    selecting, by the network infrastructure manager, a first UE as a destination UE in accordance with the long-term SINRs;
    selecting, by the network infrastructure manager, a second UE as a relay UE for the destination UE;
    transmitting a first request to cause installation of a virtual range extender (vREX) UE on the destination UE;
    transmitting a second request to cause installation of a vREX forwarding agent (FA) on the relay UE, wherein the vREX FA is configured to act as a FA for the vREX UE;
    transmitting, by the network infrastructure manager to a network control plane, a network topology comprising the vREX UE and the vREX FA;
    receiving, by the network infrastructure manager from the network control plane, transmission forwarding paths for the network; and
    reconfiguring, by the network infrastructure manager, the vREX UE and the vREX FA in accordance with the transmission forwarding paths.

2. The method of claim 1, further comprising, prior to instructing installation of the vREX FA, offering one or more installation incentives to the relay UE.

3. The method of claim 2, wherein the one or more installation incentives comprises a reduced price for access to the network, a higher priority level for relay UE traffic, or a combination thereof.

4. The method of claim 1, further comprising, after instructing installation of the vREX UE and the vREX FA, receiving respective acknowledgements indicating successful installations of the vREX UE and the vREX FA.

5. The method of claim 1, further comprising:
    storing the network topography information and channel quality feedback in a network conditions database; and
    monitoring the network conditions database.

6. The method of claim 1, wherein selecting the first UE as the destination UE comprises selecting the first UE in accordance with network status information and historic channel condition information for the network.

7. The method of claim 1, wherein selecting the second UE as the relay UE comprises selecting a potential relay UE within transmission range of the destination UE.

8. The method of claim 1, wherein selecting the second UE as the relay UE comprises selecting a potential relay UE having a shortest pathway between a network gateway through the potential relay UE to the destination UE.

9. The method of claim 1 further comprising dynamically reconfiguring a plurality of vREX FAs and/or vREX UEs in accordance with the network topology, transmission channel quality, quality of service requirements, or a combination thereof.

10. A network infrastructure manager comprising:
    a processor; and
    a computer readable storage medium storing programming for execution by the processor, the programming including instructions to:
        estimate long-term signal to noise ratios (SINRs) for user equipments (UEs) in a network in accordance with network topology information of the network and channel quality feedback from UEs in the network;
        select a first UE in the network as a destination UE in accordance with the long-term SINRs;
        select a second UE in the network as a relay UE for the destination UE;
        transmit a first request to cause installation of a virtual range extender (vREX) UE on the destination UE;
        transmit a second request to cause installation of a vREX forwarding agent (FA) on the relay UE, wherein the vREX FA is configured to act as a FA for the vREX UE;
        transmit, to a network control plane, a network topology comprising the vREX UE and the vREX FA;
        receive, from the network control plane, transmission forwarding paths for the network; and
        reconfigure the vREX UE and the vREX FA in accordance with the transmission forwarding paths.

11. The network infrastructure manager of claim 10, wherein the programming includes further instructions to receive respective acknowledgements indicating successful installations of the vREX UE and the vREX FA.

12. The network infrastructure manager of claim 11, wherein the network control plane comprises a software defined network (SDN) controller and a software defined protocol (SDP) controller, wherein the SDN controller is configured to perform traffic engineering for the network using the network topology, and wherein the SDP controller is configured to provision one or more protocols for the vREX UE and the vREX FA.

13. The method of claim 1 further comprising:
    prior to instructing installation of the vREX UE on the destination UE, negotiating installation of the vREX on the destination UE; and
    prior to instructing installation of the vREX FA on the relay UE, negotiating installation of the vREX FA on the relay UE.

14. The network infrastructure manager of claim 10, wherein the programming includes further instructions to:
    negotiate installation of the vREX on the destination UE prior to the instructions to install of the vREX UE on the destination UE; and
    negotiate installation of the vREX FA on the relay UE prior to the instructions to instruct installation of the vREX FA on the relay UE.

15. The network infrastructure manager of claim 10, wherein the programming includes further instructions to, prior to instructing installation of the vREX FA, offer one or more installation incentives to the relay UE.

16. The network infrastructure manager of claim 10, wherein the instructions to select the first UE as the destination UE comprise instructions to select the first UE in accordance with network topography information of the network and channel quality feedback from UEs in the network.

17. The network infrastructure manager of claim 10, wherein the instructions to select the first UE as the destination UE comprise instructions to select the first UE in accordance with network status information and historic channel condition information for the network.

18. The network infrastructure manager of claim 10, wherein the instructions to select the second UE as the relay UE comprise instructions to select a potential relay UE within transmission range of the destination UE.

19. The network infrastructure manager of claim 10, wherein instructions to select the second UE as the relay UE comprise instructions to select a potential relay UE having a shortest pathway between a network gateway through the potential relay UE to the destination UE.

20. The network infrastructure manager of claim 10 wherein the programming includes further instructions to:
   store the network topography information and channel quality feedback in a network conditions database; and
   monitor the network conditions database.

* * * * *